(12) United States Patent
Park et al.

(10) Patent No.: US 8,538,495 B2
(45) Date of Patent: Sep. 17, 2013

(54) METHOD OF LOW DUTY MODE OPERATION IN A FEMTO BASE STATION IN CONSIDERATION OF A FEMTO CELL TYPE

(75) Inventors: Gi Won Park, Anyang-si (KR); Yong Ho Kim, Anyang-si (KR); Ki Seon Ryu, Anyang-si (KR); Jin Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 13/320,667

(22) PCT Filed: May 24, 2010

(86) PCT No.: PCT/KR2010/003243
§ 371 (c)(1),
(2), (4) Date: Nov. 15, 2011

(87) PCT Pub. No.: WO2010/137831
PCT Pub. Date: Dec. 2, 2010

(65) Prior Publication Data
US 2012/0077486 A1 Mar. 29, 2012

Related U.S. Application Data

(60) Provisional application No. 61/180,881, filed on May 24, 2009, provisional application No. 61/185,197, filed on Jun. 9, 2009, provisional application No. 61/229,278, filed on Jul. 29, 2009.

(30) Foreign Application Priority Data

Feb. 2, 2010 (KR) .................. 10-2010-0009466

(51) Int. Cl.
*H04M 1/00* (2006.01)
(52) U.S. Cl.
USPC ........... 455/574; 455/572; 455/573; 455/444; 455/561
(58) Field of Classification Search
USPC ...... 455/434, 572, 574, 418, 422.1; 370/311, 370/318
See application file for complete search history.

(56) References Cited

U.S. PATENT DOCUMENTS

| | | | |
|---|---|---|---|
| 2004/0125811 A1* | 7/2004 | Raad et al. | 370/400 |
| 2008/0081647 A1 | 4/2008 | Lee et al. | |
| 2011/0003591 A1* | 1/2011 | Venkatachalam et al. | 455/434 |

FOREIGN PATENT DOCUMENTS

KR 10-2006-0034255 A 4/2006

* cited by examiner

*Primary Examiner* — Kathy Wang-Hurst
(74) *Attorney, Agent, or Firm* — McKenna Long & Aldridge LLP

(57) ABSTRACT

The present invention relates to a broadband wireless access system including a femto cell, and more particularly, to a method of low duty operation in a femto base station. According to one embodiment of the present invention, in a broadband wireless access system, a method of a low duty mode operation of a femto base station saving power includes the steps of determining a low duty mode pattern to be performed by the femto base station according to a preset reference and performing the low duty mode operation according to the determined pattern. In this case, the preset reference can include at least one selected from the group consisting of a battery level, an available resource status and a subscriber type of the femto base station.

15 Claims, 9 Drawing Sheets

METHOD OF LOW DUTY MODE OPERATION IN A FEMTO BASE STATION IN CONSIDERATION OF A FEMTO CELL TYPE

This application is a 35 U.S.C. § 371 National Stage entry of International Application No. PCT/KR2010/003243, filed on May 24, 2010, and claims the benefit of U.S. Provisional Patent Application Nos. 61/180,881, filed May 24, 2009, 61/185,197, filed Jun. 9, 2009, 61/229,278, filed Jul. 29, 2009, and Korean Patent Application No. 10- 2010-0009466, Feb. 2, 2010, each of which are hereby incorporated by reference in their entireties as if fully set forth herein.

TECHNICAL FIELD

The present invention relates to a broadband wireless access system including a femto cell, and more particularly, to a method of low duty operation in a femto base station.

BACKGROUND ART

A femtocell will be described in brief.

Femto is a prefix in the metric system, denoting a factor of 10-15. Hence a femtocell or FBS refers to an ultra-small indoor Access Point (AP) for low-power home use or office use. Although the term "femtocell" is sometimes interchangeably used with "picocell", the former is used in the sense of a more advanced cell. The FBS is a small cellular BS connected to a broadband router and functions to connect 2nd Generation (2G) and 3rd Generation (3G) voice and data to a backbone network of a mobile communication service provider via the Digital Subscriber Line (DSL).

An investigation report was released, saying that FBSs would accelerate 3G proliferation and could be a driving force behind expansion of indoor coverage. It is forecast that by 2011, there will be 102 million users of users of femtocell products and 32 million APs worldwide. According to chief analyst of ABI Research, Stuart Carlaw, "From a technological standpoint, their better in-building coverage for technologies such as WCDMA, HSDPA and EVDO is an incredibly important aspect of service delivery. From a strategic and financial standpoint, the routing of traffic through the IP network significantly enhances network quality and capacity, and reduces the OPEX that carriers expend on backhaul."

Femtocells can expand cell coverage and increase the quality of voice service. Mobile communication service providers are expecting that subscribers may be familiar with 3G by providing data service via femtocells. The femtocells are also called FBSs or femto Base Transceiver Stations (BTSs).

In summary, femtocells offer the following benefits.
1. Cell coverage improvement
2. Infrastructure cost decrease
3. New service offering
4. Fixed Mobile Convergence (FMC) acceleration.

One or more femtocells may be grouped on a service basis or geological area basis. For example, a femtocell group that allows access to a restricted group of Mobile Stations (MSs) is called a Closed Subscriber Group (CSG). An FBS allows access only to an MS that has subscribed to the CSG by checking the CSG Identifier (ID) of the MS.

FIG. 1 illustrates an exemplary network configuration including FBSs.

FBSs are new network entities added to a legacy network. Accordingly, the use of FBSs may bring about additions or modifications to an entire network structure. An FBS may directly access the Internet and function as a BS. Therefore, the FBS can perform almost all functions of a macro BS. In addition, the FBS may relay data from the macro BS to MSs.

In FIG. 1, the network is configured by adding a Femto Network Gateway (FNG) to the legacy network. The FNG may communicate with an Access Service Network (ASN) gateway and a Connectivity Service Network (CSN). The FNG may use an Rx interface for communicating with the ASN and an Ry interface for communicating with the CSN.

An FBS may access directly a Transmission Control Protocol/Internet Protocol (TCP/IP) Internet and receive a service from the CSN via the FNG. An MS connected to the FBS may receive services from the FNG or CSN in relation to IP Multimedia Subsystem (IMS) authentication, etc.

The FBS is connected to an AP via an R1 interface. This means that the FBS may receive a downlink channel from a macro BS. The FBS may also transmit a control signal to the macro BS.

Femto cells can be classified into the following three types according to a service provided type (i.e., a provided target, e.g., a BS subcarrier type).

1. Open subscriber group femto cell base station (OSG femto cell BS): Every mobile station is granted to receive a service provided by a femto cell.

2. Closed subscriber group open femto cell base station (CSG open femto cell BS): This BS provides all services to a mobile station registered with a closed subscriber group (CSG). Yet, this BS just provides a basic service to a non-registered mobile station.

3. Closed subscriber group open femto cell base station (CSG open femto cell BS): This BS provides a service only to a mobile station registered with a closed subscriber group.

Generally, in a broadband wireless access system, since a number of mobile stations are connected to a macro base station, power consumption of a base station has not been taken into consideration. However, in femto cell supported environment, the number of mobile stations supported by one femtocell is limited (e.g., about 5 to 6 mobile stations). Occasionally, a mobile station maintaining a connection to a femto cell for specific duration may not exist. If the above-described situations repeatedly take place, a femtocell continues to provide a prescribed service to a specific mobile station that does not require the corresponding service. Accordingly, the demand for overcoming the above situations (i.e., femto cell BS power saving) is rising.

Moreover, a mobile station should detect femto cells around to enter a femto cell within a network. Therefore, a method of facilitating a mobile station to detect a femto cell around is necessary.

Besides, a method of reducing interference between a macro cell and a femto cell by turning off the femto cell is necessary as well.

DISCLOSURE OF INVENTION

Technical Problem

An object of the present invention is to provide a method of low duty operation in a femto base station, by which a femto cell can efficiently operate in a low duty mode in a wireless access communication system supporting the femto cell.

Another object of the present invention is to provide a method of low duty operation in a femto base station, by which a different low duty mode pattern is applied according to a type of a femto cell.

Another object of the present invention is to provide a method of low duty operation in a femto base station, by which a mobile station is enabled to be implicitly aware of a low duty mode pattern.

A further object of the present invention is to provide a method of low duty operation in a femto base station, by which the femto base station is able to determine a low duty mode pattern to follow according to one of various conditions.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The present invention discloses an efficient low duty mode operating method of a femto base station to solve the above technical tasks.

To achieve these and other advantages and in accordance with the purpose of the present invention, as embodied and broadly described, in a broadband wireless access system, a method of a low duty mode operation of a femto base station saving power according to the present invention includes the steps of determining a low duty mode pattern to be performed by the femto base station according to a preset reference and performing the low duty mode operation according to the determined pattern, wherein the preset reference includes at least one selected from the group consisting of a battery level, an available resource status and a subscriber type of the femto base station.

Preferably, if the preset reference includes the subscriber type, the determining step is performed in a manner of determining a first low duty mode pattern if the subscriber type is a closed subscriber group (CSG) open state or a second low duty mode pattern if the subscriber type is a closed subscriber group (CSG) closed state. And, the first low duty mode pattern is set to have a ratio of an available interval versus a same time set greater by a prescribed magnification than that of the second low duty mode pattern.

Preferably, if the preset reference includes the battery level or the available resource status, the determining step is performed in a manner of determining a first low duty mode pattern if the battery level or the available resource status is equal to or greater than a preset threshold or a second low duty mode pattern if the battery level or the available resource status is smaller than the preset threshold. And, the first low duty mode pattern is set to have a ratio of an available interval versus a same time set greater by a prescribed magnification than that of the second low duty mode pattern.

Preferably, the method further includes the step of transmitting at least one of a cellbar bit set to a value corresponding to the determined low duty mode pattern and information on the determined low duty mode pattern to a mobile station.

More preferably, the transmitting step is performed via one selected from the group consisting of a deregistration command (AAI_DREG-CMD) message, a sleep response (AAI_SLP-RSP) message, a ranging response (AAI_RNG-RSP) message, a neighbor advertisement (AAI_NBR-ADV) message and a super frame header (SFH).

More preferably, the cellbar bit includes one selected from the group consisting of a closed subscriber group cellbar bit indicating availability or unavailability for a service for a random mobile station according to a presence or non-presence of subscription of a closed subscriber group and a femto cellbar bit indicating a presence or non-presence of availability for a service to every mobile station.

To further achieve these and other advantages and in accordance with the purpose of the present invention, a method of scanning a femto base station, which operates a mobile station in a low duty mode (LDM), in a broadband wireless access system including a femto cell according to the present invention includes the steps of obtaining at least one selected from information on the group consisting of a cellbar bit set to a value corresponding to a low duty mode pattern applied to the femto base station, information on a low duty cycle ID (LDC ID) having the low duty mode mapped thereto, and information on the low duty mode pattern, determining a low duty cycle of the low duty mode (LDM) pattern using the obtained information, and scanning the femto base station in an available interval (AI) of the low duty cycle.

Preferably, the information on the low duty mode pattern includes at least one selected from the group consisting of a start frame information indicating a frame number or super frame number at a timing point that the femto base station operates in the low duty mode, a low duty cycle information indicating a length resulting from adding one available interval (AI) and one unavailable interval (UAI) in the low duty mode pattern and an available interval information indicating a length of the available interval.

Preferably, the obtaining step is performed via one selected from the group consisting of a deregistration command (AAI_DREG-CMD) message, a sleep response (AAI_SLP-RSP) message, a ranging response (AAI_RNG-RSP) message, a neighbor advertisement (AAI_NBR-ADV) message and a super frame header (SFH) and wherein the selected one is transmitted by the femto base station or a macro base station including the femto base station.

Preferably, the cellbar bit includes one selected from the group consisting of a closed subscriber group cellbar bit indicating availability or unavailability for a service for a random mobile station according to a presence or non-presence of subscription of a closed subscriber group and a femto cellbar bit indicating a presence or non-presence of availability for a service to every mobile station.

Preferably, the low duty mode pattern is determined with reference to at least one selected from the group consisting of a battery level, an available resource status and a subscriber type of the femto base station.

To further achieve these and other advantages and in accordance with the purpose of the present invention, a mobile station, which operates in a broadband wireless access system, according to the present invention includes a processor and a radio communication (RF) module configured to transceive a radio signal externally under the control of the processor. In this case, the processor controls the radio communication module to obtain at least one selected from the group consisting of information on a cellbar bit set to a value corresponding to a low duty mode pattern applied to a femto base station operating in a low duty mode, information on a low duty cycle ID (LDC ID) having the low duty mode mapped thereto, and information on the low duty mode pattern, determines a low duty cycle of the low duty mode (LDM) pattern using the obtained information, and scans the femto base station in an available interval (AI) of the low duty cycle.

Preferably, the information on the low duty mode pattern includes at least one selected from the group consisting of a start frame information indicating a frame number or super frame number at a timing point that the femto base station operates in the low duty mode, a low duty cycle information indicating a length resulting from adding one available interval (AI) and one unavailable interval (UAI) in the low duty mode pattern and an available interval information indicating a length of the available interval.

Preferably, the information on the cellbar bit, the information on the low duty cycle (LDC) ID and the information on the low duty mode pattern are obtained via one selected from the group consisting of a deregistration command (AAI_DREG-CMD) message, a sleep response (AAI_SLP-RSP) message, a ranging response (AAI_RNG-RSP) message, a neighbor advertisement (AAI_NBR-ADV) message and a super frame header (SFH) and wherein the selected one is transmitted by the femto base station or a macro base station including the femto base station.

Preferably, the cellbar bit includes one selected from the group consisting of a closed subscriber group cellbar bit indicating availability or unavailability for a service for a random mobile station according to a presence or non-presence of subscription of a closed subscriber group and a femto cellbar bit indicating a presence or non-presence of availability for a service to every mobile station.

Preferably, the low duty mode pattern is determined with reference to at least one selected from the group consisting of a battery level, an available resource status and a subscriber type of the femto base station.

It is to be understood that both the foregoing general description and the following detailed description are exemplary and explanatory and are intended to provide further explanation of the invention as claimed.

Advantageous Effects of Invention

Accordingly, the present invention provides the following effects or advantages.

First of all, using embodiments of the present invention, it is able to minimize power consumption of a femto base station and interference with a macro cell in a wireless access system supporting a femtocell.

Secondly, using embodiments of the present invention, a different low duty mode pattern is applied according to a type of a femto cell, whereby an efficient low duty mode operation is enabled.

Thirdly, the present invention is efficient because a mobile station is able to operate in a manner of being implicitly aware of a low duty mode pattern of a femto base station via a super frame header or a prescribed MAC message.

Fourthly, the present invention is efficient because a femto base station determines a low duty mode pattern to follow in consideration of its state such as a battery level, an available resource and the like.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
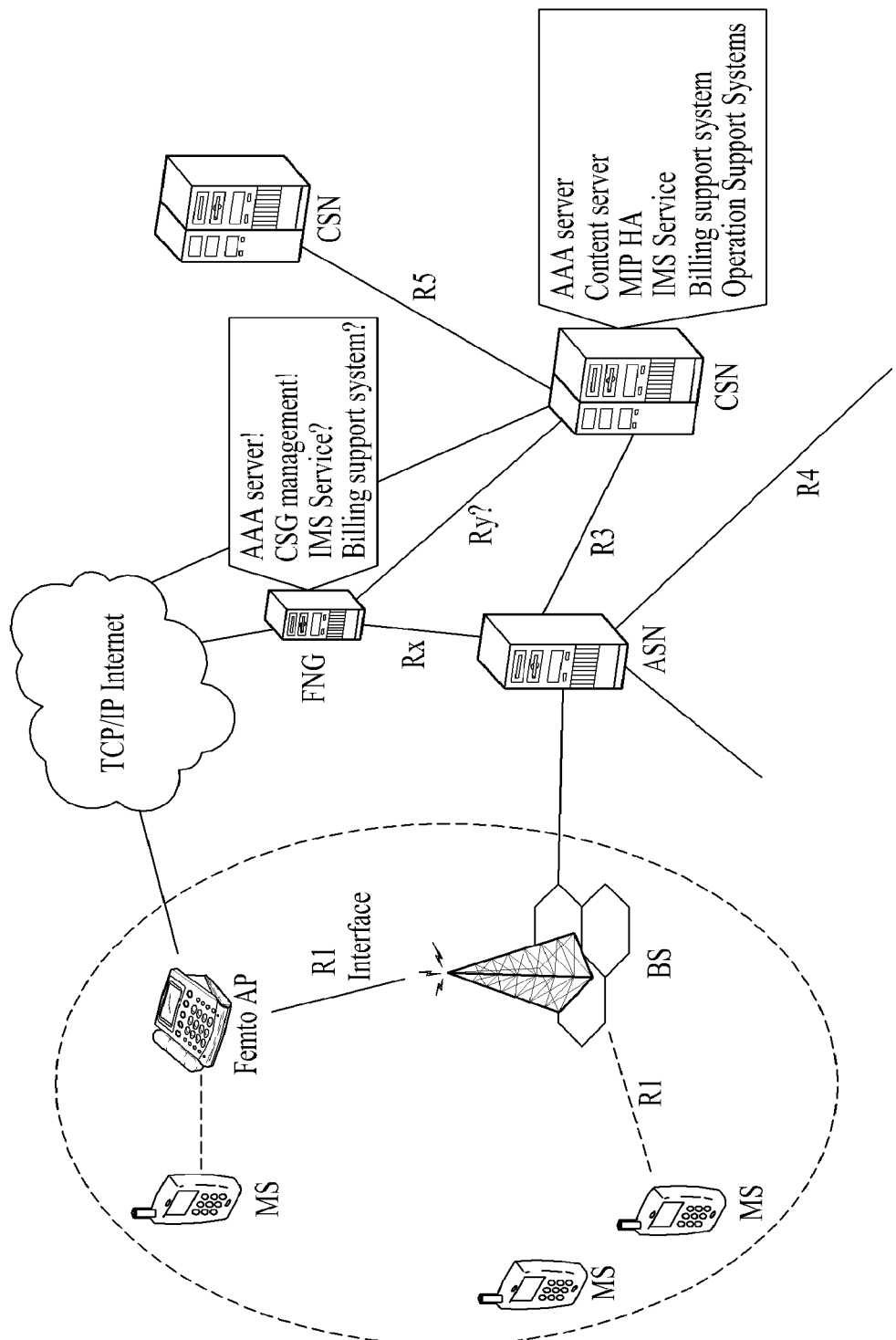
FIG. 1 is a diagram of an example for a network structure including a femto base station (FBS)

The present invention relates to a wireless access system. Reference will now be made in detail to methods of efficient low duty mode operation in a femto base station according to various embodiments of the present invention, examples of which are illustrated in the accompanying drawings.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may ruin the substance of the present invention, are not explained. And, procedures or steps, which can be understood by those skilled in the art, are not explained as well.

In exemplary embodiments of the present invention, a description is made of a data transmission and reception relationship between a BS and a Mobile Station (MS). Herein, the term BS refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term BS may be replaced with the term fixed station, Node B, eNode B (eNB), access point, Advanced Base Station (ABS) etc. The term MS may be replaced with the term User Equipment (UE), Subscriber Station (SS), Mobile Subscriber Station (MSS), mobile terminal, Advanced Mobile Station (AMS), etc.

A transmitter means a node that transmits voice or data service and a receiver means a node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminologies used herein may be supported by at least one of P802.16-2004, P802.16e-2005, and P802.16Rev2 documents which are the standards of IEEE 802.16.

Specific terms used for the exemplary embodiments of the present invention are provided to help the understanding of the present invention. These specific terms may be replaced with other terms within the scope and spirit of the present invention.

In the following description, a low duty mode of a femto base station according to the present invention is explained.

First of all, a femto base station according to the present invention can exist within a whole network, a coverage area of at least one macro base station (MBS) or an area corresponding to a macro cell or at least one paging group.

Secondly, a femto base station according to the present invention can enter a low duty mode to save power and reduce interference with a neighbor cell as well as a normal operation mode.

A low duty operation can include an available interval (AI) and an unavailable interval (UAI). A role played by a femto base station in each of the intervals is described as follows.

First of all, regarding the available interval, a femto base station is able to activate a radio interface for paging, system information transmission, ranging or data traffic transmission during the available interval. In particular, the femto base station is able to transmit a synchronization channel and/or super frame header (SFH) in downlink during the available interval. Moreover, the femto base station is able to monitor whether an access try, which is transmitted by a mobile station, e.g., a ranging code transmission exists in a preset uplink interval.

Secondly, regarding the unavailable interval, a femto base station does not perform a transmission on a radio interface during the unavailable interval. Through this, the femto base station alleviates interference with an adjacent femto base station using the same frequency or a macro base station as soon as reduces its power consumption. Moreover, the femto base station performs synchronization with a macro base station (overlay macro BS) including itself or is able to measure interference from a neighbor cell.

For clarity and convenience, in this disclosure, one available interval and one unavailable interval are named a low duty cycle.

In the following description, conditions for a femto base station to enter the above mentioned low duty mode are explained.

First of all, a low duty mode entry condition of a femto base station can be determined according to a presence or non-presence of a mobile station operating in normal mode by being attached to the femto base station. In particular, the femto base station is able to enter the low duty mode if a mobile station connected to the femto base station operates in idle or sleep mode or any mobile station fails to exist within a service range of the femto base station.

In this case, sequences of the available and unavailable intervals can for a low duty mode pattern (hereinafter abbreviated LDM pattern). Specifically, repetition of one available interval and one unavailable interval can becomes a default LDM pattern. In case that a femto base station enters a low duty mode, a default LDM pattern of a corresponding femto base station can be activated. In doing so, the femto base station can have one or more default LDM patterns.

The following parameters can be contained in the default LDM pattern.

Available interval (AI): As a value indicating a length of an available interval, the available interval is preferably set by a unit of 4 frames.

Unavailable interval (UAI): As a value indicating a length of an unavailable interval, the unavailable interval is preferably set by a unit of 4 frames as well.

Start super frame number: This indicates a number of a super frame with which a low duty mode starts.

The default LDM pattern is pre-provisioned in a prescribed region by a communication service provider or another subject, follows a format of a broadcast message of a macro/femto base station, or is unicasted to a mobile station by a femto base station.

In the following description, explained are messages for informing a mobile station of an LDM pattern applicable to embodiments of the present invention.

First of all, LDM pattern information is broadcasted to a mobile station by a macro base station and/or a femto base station via SFH or a neighbor advertisement (AAI_NBR-ADV) message or can be unicast via such a message as a deregistration command (AAI_DREG-CMD), a sleep response (AAI_SLP-RSP), a ranging response (AAI_RNG-RSP) and the like.

When the above mentioned messages are applied to embodiments of the present invention, new fields for indicating LDM pattern information are added. This is explained with reference to Table 1 as follows.

Table 1 shows one example for types of fields added to medium access control (MAC) messages applicable to embodiments of the present invention.

TABLE 1

| Syntax | Size(bit) | Notes |
|---|---|---|
| AAI_XXX_Message_format( ) { ~ | — | — |
| FFI (Femto Frequency Information) | | Frequency bands available for a femto base station |
| LDC (Low Duty Cycle) information { LDC information for CSG Closed Femtocell BS { | | |
| Start Frame | | Frame Number or Super frame number at the timing point for a femto BS to enter a low duty mode |
| LDC (Low Duty Cycle) | | Interval for Femto BS to operate in Low Duty Mode therein |
| AI (Available Interval) | | This indicates an available interval in the interval in which Femto BS operates in Low Duty mode. Namely, during this interval, an MS is able to receive a preamble or SFH sent by Femtocell BS and is able to transmit a signaling message to Femtocell BS in UL interval. |
| } ~ } //End of AAI_RNG-RSP | | |

Referring to Table 1, a MAC message according to the present invention can be configured in a manner that a femto frequency information (FFI) field, a start frame field, a low duty cycle (LDC) field and an available interval (AI) field are further added to a message.

In this case, the start frame field is the field indicating a frame number or a super frame number at a timing point for a femto base station to operate in low duty mode. The low duty cycle field indicates a length resulting from adding one available interval and one unavailable interval in an LDM pattern of a femto base station together. And, the AI field indicates a length of an available interval in a low duty cycle.

Meanwhile, the FFI filed is the field indicating a frequency band used by a femto base station and its detailed format is described with reference to Table 2 in the following.

Table 2 shows one example for types of the femto frequency information field applicable to embodiments of the present invention.

TABLE 2

| Type | Length | Value | Scope |
|---|---|---|---|
| | | Enumerated(Band I, Band II, Band III, Band IV, Band VIII, Band IX, Band X, Band XI, Band XII, Band XIII, Band XIV, Band XV, Band XVI, Band XVII, Band XVIII, Band XIX, Band XX, Band XXI, Band XXII, extension indicator) | SFH, Additional system information, AAI_NBR-ADV |

Referring to Table 2, the FFI field represents a value of a band used by a femto base station as one of 1 to 22 or can be set to an extension indication value.

Meanwhile, according to embodiments of the present invention, assume that a macro base station (overlay macro BS) and a femto base station belonging thereto are synchronized with each other.

Embodiments of the present invention are described as follows.

First Embodiment

According to one embodiment of the present invention, provided is an operating method in a different low duty mode pattern in correspondence with a type of a femto base station according to a service provided target (i.e., femto BS subscriber type). This is explained with reference to FIG. 2 as follows.

Figure 2:
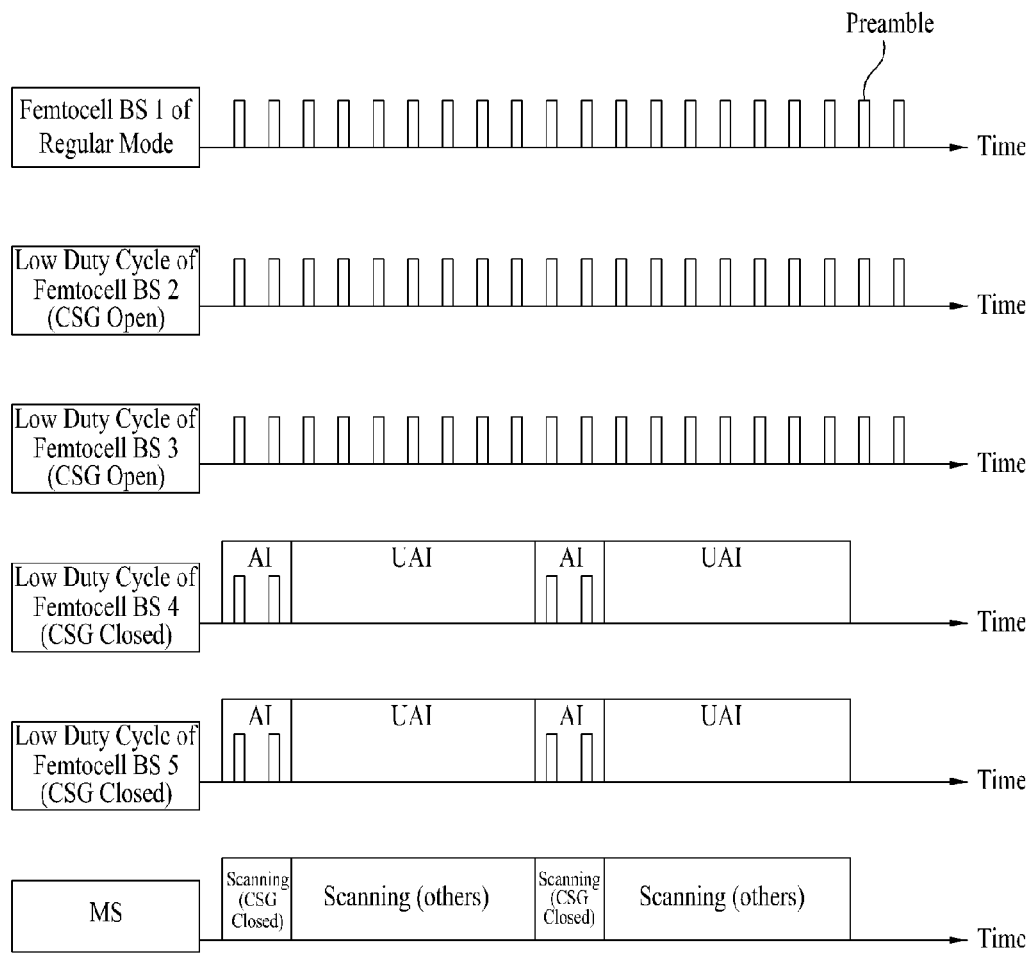
FIG. 2 is a diagram of one example for a low duty mode operation of a femto base station according to one embodiment of the present invention.

FIG. 2 is a diagram of one example for a low duty mode operation of a femto base station according to one embodiment of the present invention.

Referring to FIG. 2, a femto base station operating in regular mode and a femto base station of CSG open type do not enter a low duty mode. And, a femto base station of a CSG closed type operates in a low duty mode of a prescribed LDM pattern.

The CSG open femto base station grants an access of a mobile station failing to subscribe a CSG (i.e., non-CSG member) to have a property of an OSG femto base station. Thus, a low duty mode operation is applied to the CSG closed femto base station only and may not be applied to the CSG open femto base station to always grant an access to the non-CSG member.

Meanwhile, it is able to help a mobile station to perform a scanning process in a manner of synchronizing LDM pattern of every CSG closed femto base station within a macro base station. In particular, in order to search or detect a CSG closed femto base station, a mobile station is able to scan CSG femto base stations in an available interval using the previously acquired LDM pattern information of the CSG closed femto base station. In other words, the mobile station is able to decode a preamble and super frame header, which is transmitted by a femto base station in an available interval of a low duty cycle indicated by the LDM pattern information of the CSG closed femto base station, to scan the CSG closed femto base stations.

According to another example of the present embodiment, a length of an available length of a low duty cycle can be set different according to a type of a femto base station. This is explained with reference to FIG. 3 as follows.

Figure 3:
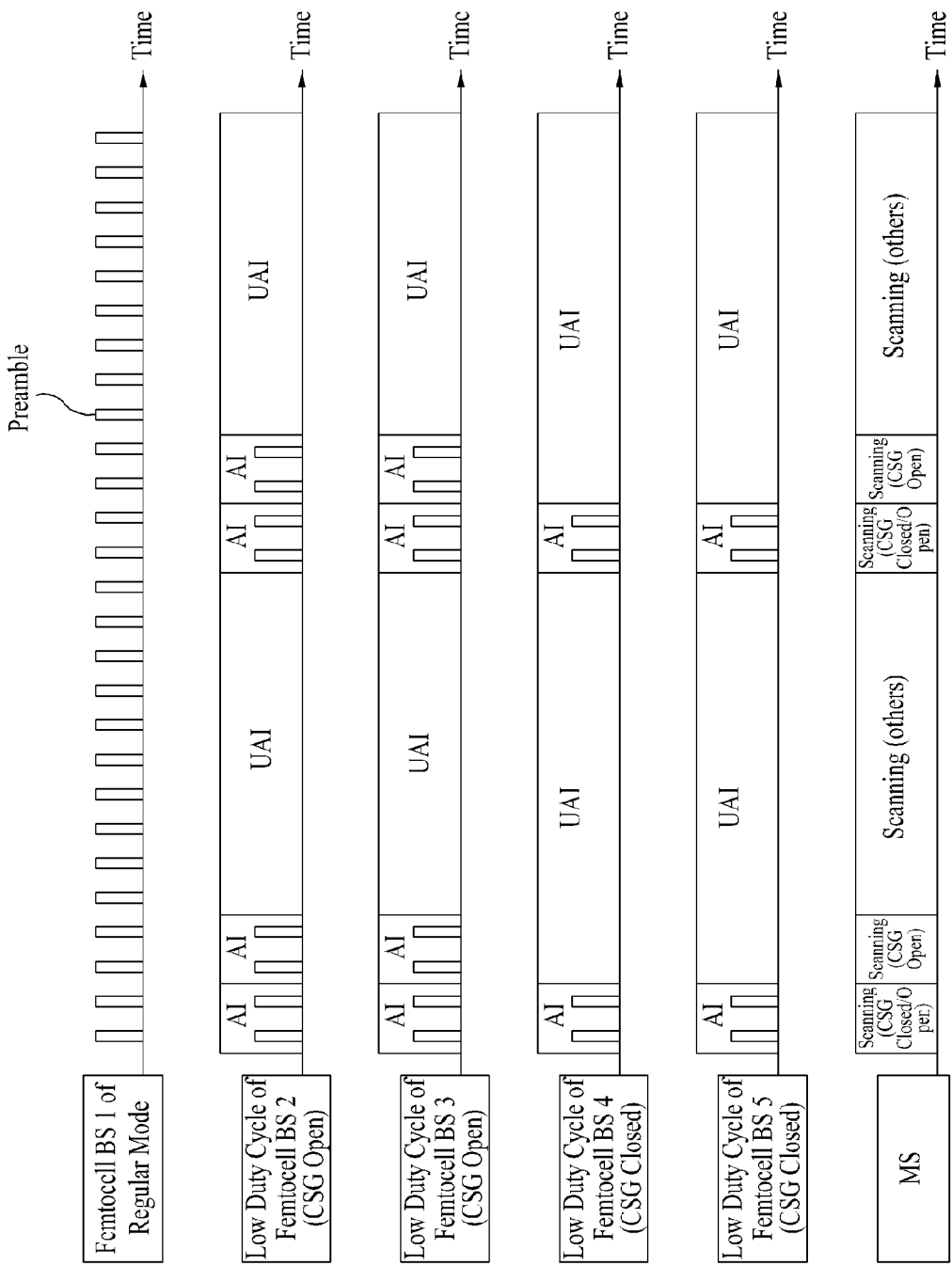
FIG. 3 is a diagram of another example for a low duty mode operation of a femto base station according to one embodiment of the present invention.

FIG. 3 is a diagram of another example for a low duty mode operation of a femto base station according to one embodiment of the present invention.

Referring to FIG. 3, according to another example of the present embodiment, a low duty mode is basically applied to both a CSG closed femto base station and a CSG open femto base station. Yet, as mentioned in the foregoing description, since the CSG open femto base station grants an access of a non-CSG member to have a property of an OSG femto base station, the number of mobile stations attempting accesses to the CSG open femto base station can be relatively greater than that of mobile stations attempting accesses to the CSG closed femto base station. Therefore, the present embodiment proposes that an available interval of the CSG open femto base station is set longer than that of the CSG closed femto base station, as shown in FIG. 3, while low duty cycles of the femto base stations of the two types are maintained.

In this case, it is able to help a mobile station to perform a scanning process in a manner of synchronizing LDM patterns of all the CSG closed femto base stations within a macro base station with each other. In particular, in order to search or detect CSG closed femto base stations, the mobile station is able to scan CSG femto base stations in an available interval using the previously acquired LDM pattern information of the CSG closed femto base station. In other words, the mobile station is able to decode a preamble and super frame header, which is transmitted by a femto base station in an available interval of a low duty cycle indicated by the LDM pattern information of the CSG closed femto base station, to scan the CSG closed femto base stations.

According to a further example of the present embodiment, a ratio of an available length included in a same time can be set different according to a type of a femto base station. This is explained with reference to FIG. 4 as follows.

Figure 4:
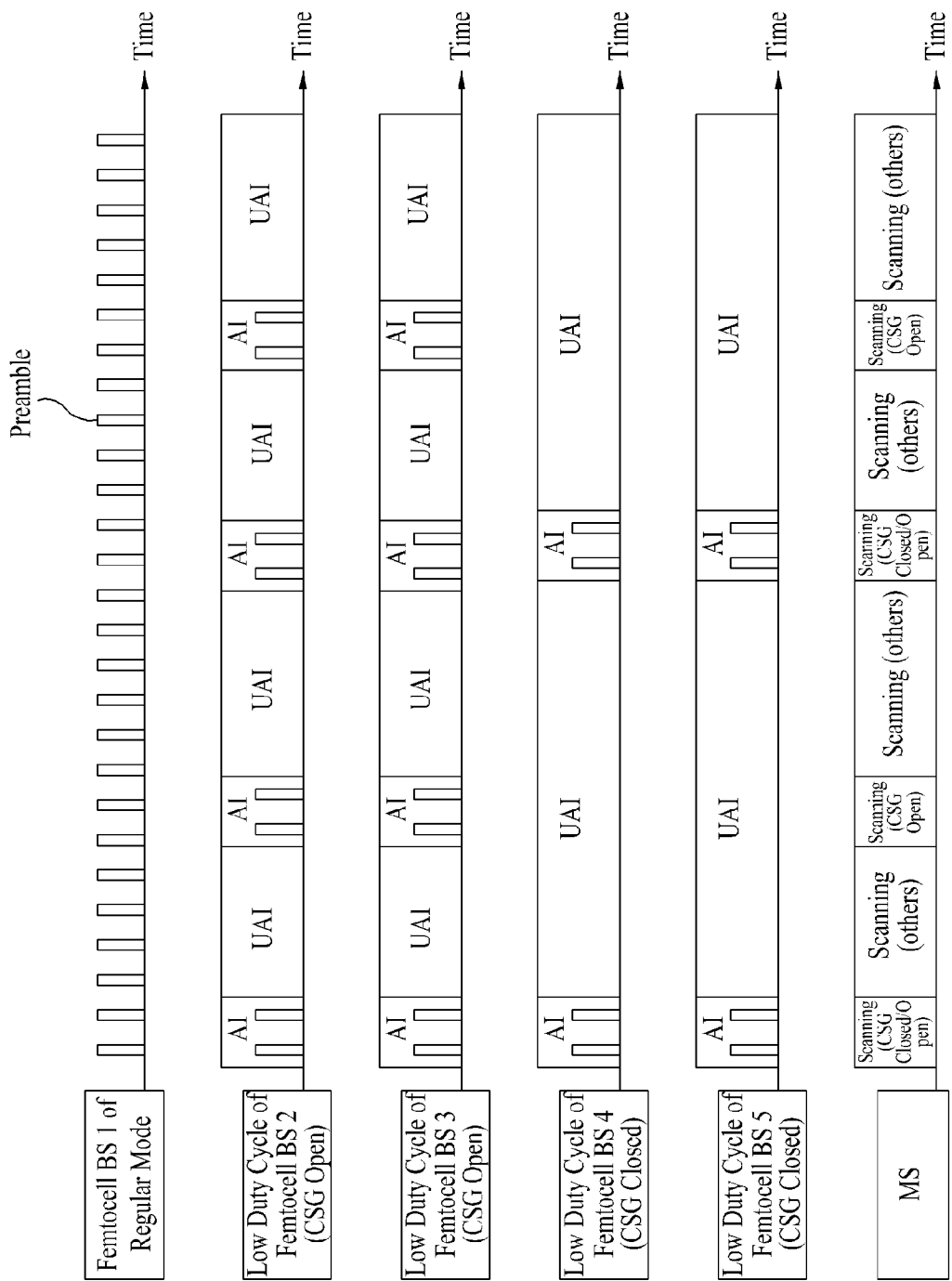
FIG. 4 is a diagram of a further example for a low duty mode operation of a femto base station according to one embodiment of the present invention.

FIG. 4 is a diagram of a further example for a low duty mode operation of a femto base station according to one embodiment of the present invention.

Referring to FIG. 4, while a length of an available interval is set fixed, a low duty cycle of a CSG open femto base station can be set shorter than that of a CSG closed femto base station. Alternatively, an available interval of a CSG open femto base station can be set to occur more frequently than that of a CSG closed femto base station within the same interval. In particular, in FIG. 4, an available interval of such a CSG open femto base station as a femto base station 2 and a femto base station 3 can occur twice frequently than that of such a CSG open femto base station as a femto base station 4 and a femto base station 5. Accordingly, if LDM patterns of all the CSG closed femto base stations within a macro base station are unified, a mobile station is able to scan a CSG open femto base station in an available interval of a low duty cycle of a CSG open femto base station, which is not overlapped with an available interval of a default low duty cycle.

The above described LDM patterns of the types can be represented as Math Figure 1 and Math Figure 2.

MathFigure 1

Low Duty Cycle of CSG Closed Femtocell
BS=Default Low Duty Cycle   [Math.1]

MathFigure 2

Low Duty Cycle of CSG Open Femtocell BS=
$2^{-n}$*Default Low Duty Cycle   [Math.2]

Referring to Math Figure 1, a low duty cycle of a CSG closed femto base station is set equal to a default low duty cycle. Referring to Math Figure 2, a low duty cycle of a CSG closed femto base station can be set 2-n times greater than that of a CSG closed femto base station. Hence, the available interval is enabled to occur more frequently in the same interval than that of the CGS closed femto base station. In this case, a value of the n is delivered by being contained in LDM pattern information transmitted by a macron base station or a femto base station. And, the default low duty cycle means a low duty cycle of a default LDM pattern.

The n value proposed by the present invention can be included as a format shown in Table 3 in one of MAC messages according to the present invention together with the LDM pattern information.

TABLE 3

| Syntax | Size(bit) | Notes |
|---|---|---|
| FFI (Femto Frequency Information) | | Refer to Table 2 |
| Default LDC (Low Duty Cycle) information { | | |
| Start Frame | | Frame Number or Super frame number at a timing point that Femto BS enters a low duty mode |

TABLE 3-continued

| Syntax | Size(bit) | Notes |
|---|---|---|
| LDC (Low Duty Cycle) | | Interval for Femto BS to operate in Low Duty Mode |
| AI (Available Interval) | | This indicates an available interval in an interval for Femto BS to operate in Low Duty mode. In particular, MS is able to receive a preamble or SFH transmitted by Femto cell BS during this interval and is able to send a signaling message to a femto cell BS in UL interval. |
| } | | |
| N | | Value applied to the following Math Figure: $2^{-n}$ * Default Low Duty Cycle |
| } | | |

Meanwhile, the CSG femto base station can change its type from a CSG open type to a CSG closed type, and vice versa. And, the CSG femto base station is able to change a low duty cycle correspondingly. This is explained with reference to FIG. 5 as follows.

Figure 5:
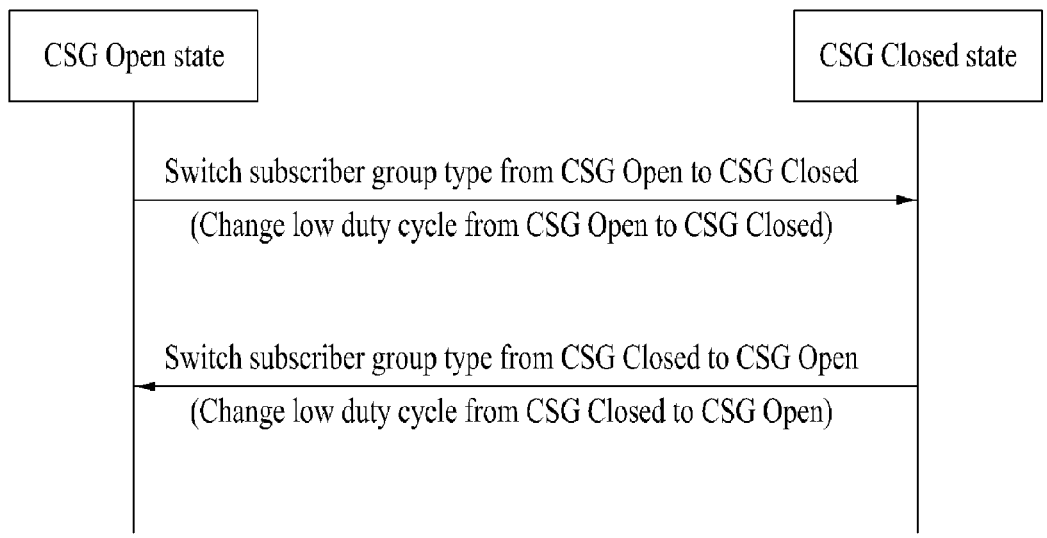
FIG. 5 is a diagram of a relation between a type change and low duty cycle of a femto base station according to one embodiment of the present invention.

FIG. 5 is a diagram of a relation between a type change and low duty cycle of a femto base station according to one embodiment of the present invention.

Referring to FIG. 5, a femto base station of a CSG type according to the present embodiment can change its low duty cycle to cope with a change of a subscriber group type as well.

In particular, as a random CSG femto base station of a CSG open type operates by a low duty cycle shorter than that of a CSG closed type or a low duty cycle having an available interval included therein more than that of the CSG closed type, if a state of the random CSG femto base station is changed into the CSG closed type, it operates by a low duty cycle (e.g., a default low duty cycle) corresponding to the CSG closed type. Moreover, since a bit (e.g., a CSG cell bar bit) indicating a CSG type can be included in a super frame header, if the CSG type is changed, a corresponding bit can be changed into a value corresponding to the changed type as well.

Second Embodiment

According to another embodiment of the present invention, a method of informing a mobile station of an LDM pattern applied to a femto base station implicitly is provided.

For this, after a prescribed number (e.g., N) of LDM patterns of a femto base station has been defined, if the LDM pattern to be followed by the femto base station is determined by such a scheme as Math Figure 3, a mobile station can be implicitly aware of the determined LDM pattern.

MathFigure 3

LDM pattern=Femto BS ID modulo N   [Math.3]

For instance, when the number of LDM patterns is 4 (i.e., N=4), if a remainder is 1 as a result of applying modulo 4 on an identifier of a corresponding femto base station, a mobile station can aware that the femto base station operates in a low duty mode by applying a first LDM pattern and is then able to perform scan on the corresponding femto base station according to the first LDM pattern.

The N LDM patterns can be determined by a communication service provider or a macro base station or can be determined as system parameters. The macro base station or the femto base station is able to transmit the N LDM patterns to a mobile station via a multicast or unicast message.

Meanwhile, in a manner of defining a plurality of low duty cycle IDs instead of the femto base station ID in Math Figure 3 and then mapping a LDM pattern to each of the IDs, the LDM pattern to be applied to a corresponding femto cell can be determined by Math Figure 4.

MathFigure 4

$$\text{LDM pattern} = \text{Low Duty Cycle ID modulo N} \qquad [\text{Math.4}]$$

This low duty cycle ID can be assigned to a mobile station by a macro base station or a femto base station via one of AAI_NBR-ADV, AAI_RNG-RSP, AAI_SLP-RSP, SFH and the like.

Third Embodiment

According to another embodiment of the present invention, a different LDM pattern can be applied in correspondence with a state of a femto base station. For example of a state variable of a femto base station, there is a power state of a femto base station, i.e., a battery level.

For this, the present embodiment proposes to define a battery level threshold. The present embodiment also proposes to define an LDM pattern, which will be applied if a battery level of a femto base station becomes equal to or smaller than a preset battery level threshold, and an LDM pattern, which will be applied if a battery level of a femto base station becomes greater than the preset battery level threshold, in advance.

If so, a femto base station is able to operate in an LDM pattern different according to its battery level threshold. This ex explained with reference to FIG. 6.

Figure 6:
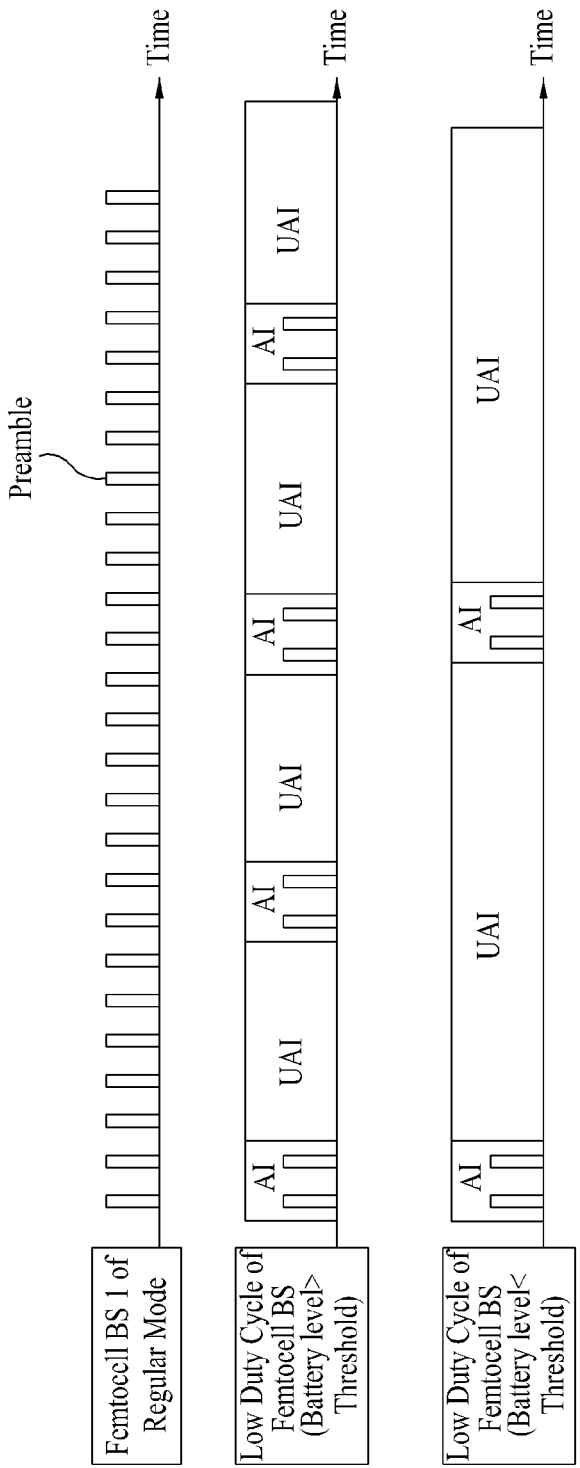
FIG. 6 is a diagram of one example for a low duty mode operation of a femto base station according to another embodiment of the present invention.

FIG. 6 is a diagram of one example for a low duty mode operation of a femto base station according to another embodiment of the present invention.

Referring to FIG. 6, if a battery level of a femto base station becomes equal to or smaller than a preset battery level threshold, the femto base station is able to operate in an LDM pattern having an available interval shorter (in this case, ½) than that of an LDM pattern, which is applied if the battery level is greater than the threshold, in the same interval to save power.

Yet, in this case, a method for informing a mobile station of the LDM pattern changed according to the lowered battery level is necessary. For this, the present embodiment proposes to use a CSG cellbar bit. As mentioned in the foregoing description, the CSG cellbar bit can be included in SFH. The application of the CSG cellbar bit is explained with reference to FIG. 7 as follows.

Figure 7:
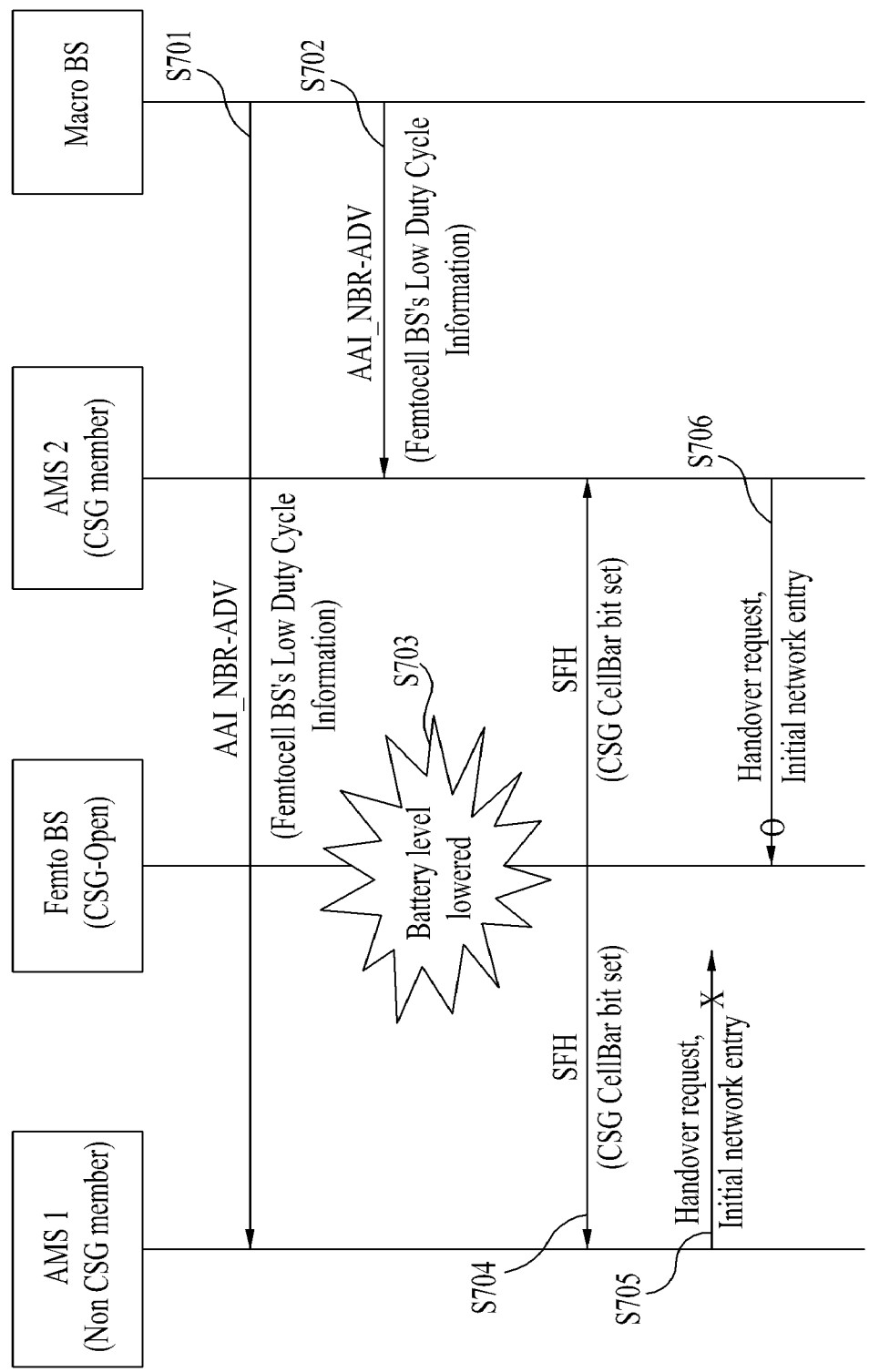
FIG. 7 is a diagram of one example for a femto base station operation in correspondence with a battery level of a femto base station according to another embodiment of the present invention.

FIG. 7 is a diagram of one example for a femto base station operation in correspondence with a battery level of a femto base station according to another embodiment of the present invention.

Referring to FIG. 7, assume that a mobile station 1 (AMS 1) is a mobile station not subscribing a CSG (i.e., a non-CSG member) of a femto base station. And, assume that a mobile station 2 (AMS 2) is a mobile station having subscribed the CSG of the femto base station.

Each of the mobile stations receives a neighbor advertisement (AAI_NBR-ADV) message from a macro base station and is then able to acquire low duty pattern (cycle) information of a femto base station from the received message [S701, S7021].

Afterwards, a battery level of the femto base station is lowered equal to or smaller than a preset threshold [S703].

When a battery level of a CSG femto base station (CSG open type) is lowered equal to or smaller than the threshold, the femto base station of the CSG open type broadcasts the service unavailability to the non-CSG member mobile stations via SFH in a manner of setting a CSG cellbar bit to a specific value, e.g., 1 [S704].

If the battery level is lowered equal to or smaller than the threshold, the CSG femto base station can operate in a low duty mode by applying a low duty cycle used for the battery level equal to or smaller than the threshold.

In this case, the AMS 1 failing to subscribe the CSG is restricted from an access to the femto base station and is unable to perform such an operation as a handover entry, an initial network entry and the like [S705].

However, even if the CSG cellbar bit is set, accesses of the CSG member mobile stations can be granted [S706].

In case of receiving the SFH in which the CSG cellbar bit is set, the mobile station is able to scan the CSG femto base station using the low duty cycle applied to the femto base station below the threshold.

The present embodiment is identically applicable to a case that the resource of the CSG femto base station is exhausted as well as a case that the battery level is lowered equal to or smaller than the threshold.

Table 4 shows one example for a format that LDM pattern information applicable to the present embodiment is included in a neighbor advertisement message.

TABLE 4

| Syntax | Size(bit) | Notes |
|---|---|---|
| AAI_NBR-ADV_Message_format( ) { — | — |  |
| ~ |  |  |
| FFI (Femto Frequency Information) |  | Refer to Table 2 |
| LDC information for CSG Femtocell BS (Battery level > threshold) { |  |  |
| Start Frame |  | Frame Number or Super frame number at a timing point that Femto BS enters a low duty mode |
| LDC (Low Duty Cycle) |  | Interval for Femto BS to operate in Low Duty Mode |
| AI (Available Interval) |  | This indicates an available interval in an interval for Femto BS to operate in Low Duty mode. In particular, MS is able to receive a preamble or SFH transmitted by Femto cell BS during this interval and is able to send a signaling message to a femto cell BS in UL interval. |
| } |  |  |
| LDC information for CSG Femtocell BS (Battery level < threshold) { |  |  |
| Start Frame |  | Frame Number or Super frame number at a timing point that Femto BS enters a low duty mode |
| LDC (Low Duty Cycle) |  | Interval for Femto BS to operate in Low Duty Mode |
| AI (Available Interval) |  | This indicates an available interval in an interval for Femto BS to operate in Low Duty mode. In particular, MS is able to receive a preamble or SFH transmitted by Femto cell BS during this interval and is able to send a signaling message to a femto cell BS in UL interval. |
| } |  |  |
| ~ |  |  |
| } //End of AAI_NBR-ADV |  |  |

Referring to Table 4, different LDM pattern information can be included in each MAC message according to a relation between a battery level and a threshold.

Information on two LDM patterns can be simultaneously included in a MAC message, as shown in Table 4. Yet, it is able to use a method of changing LDM pattern information each time a value of a CGS cellbar bit is toggled according to a battery level, as shown in Table 5.

TABLE 5

| Syntax | Size(bit) | Notes |
| --- | --- | --- |
| AAI_NBR-ADV_Message_format( ) { ~ | — | — |
| FFI (Femto Frequency Information) LDC (Low Duty Cycle) information { LDC information for CSG Femtocell BS { | | Refer to Table 5 |
| Start Frame | | Frame Number or Super frame number at a timing point that Femto BS enters a low duty mode |
| LDC (Low Duty Cycle) | | Interval for Femto BS to operate in Low Duty Mode |
| AI (Available Interval) | | This indicates an available interval in an interval for Femto BS to operate in Low Duty mode. In particular, MS is able to receive a preamble or SFH transmitted by Femto cell BS during this interval and is able to send a signaling message to a femto cell BS in UL interval. |
| } ~ } //End of AAI_NBR-ADV | | |

Namely, two kinds of LDM pattern information such as LDM pattern information in case of a battery level equal to or greater than a threshold and LDM pattern information in case of a battery level smaller than a threshold can be delivered as shown in Table 4. Yet, one LDM pattern information, as shown in Table 5, can be transmitted to a mobile station. In particular, in case that a battery level of a femto base station is lowered from a level equal to or greater than a threshold to a level below the threshold or is raised again above the threshold, a CGS cellbar bit included in SFH is toggled. Simultaneously, a mobile station is able to acquire information on the changed LDM pattern from AAI_NBR-ADV message.

In the description with reference to FIG. 7, the LDM pattern information is delivered via the AAI_NBR-ADV message, which is exemplary and by which the present invention is non-limited. Alternatively, the LDM pattern information can be delivered to a mobile station via a message (AAI_DREG-CMD, AAI_SLP-RSP, AAI_RNG-RSP, AAI_NBR-ADV, etc.) unicasted by a femto/macro base station or a message (SFH, AAI_NBR-ADV, etc.) broadcasted by a femto/macro base station.

Figure 8:
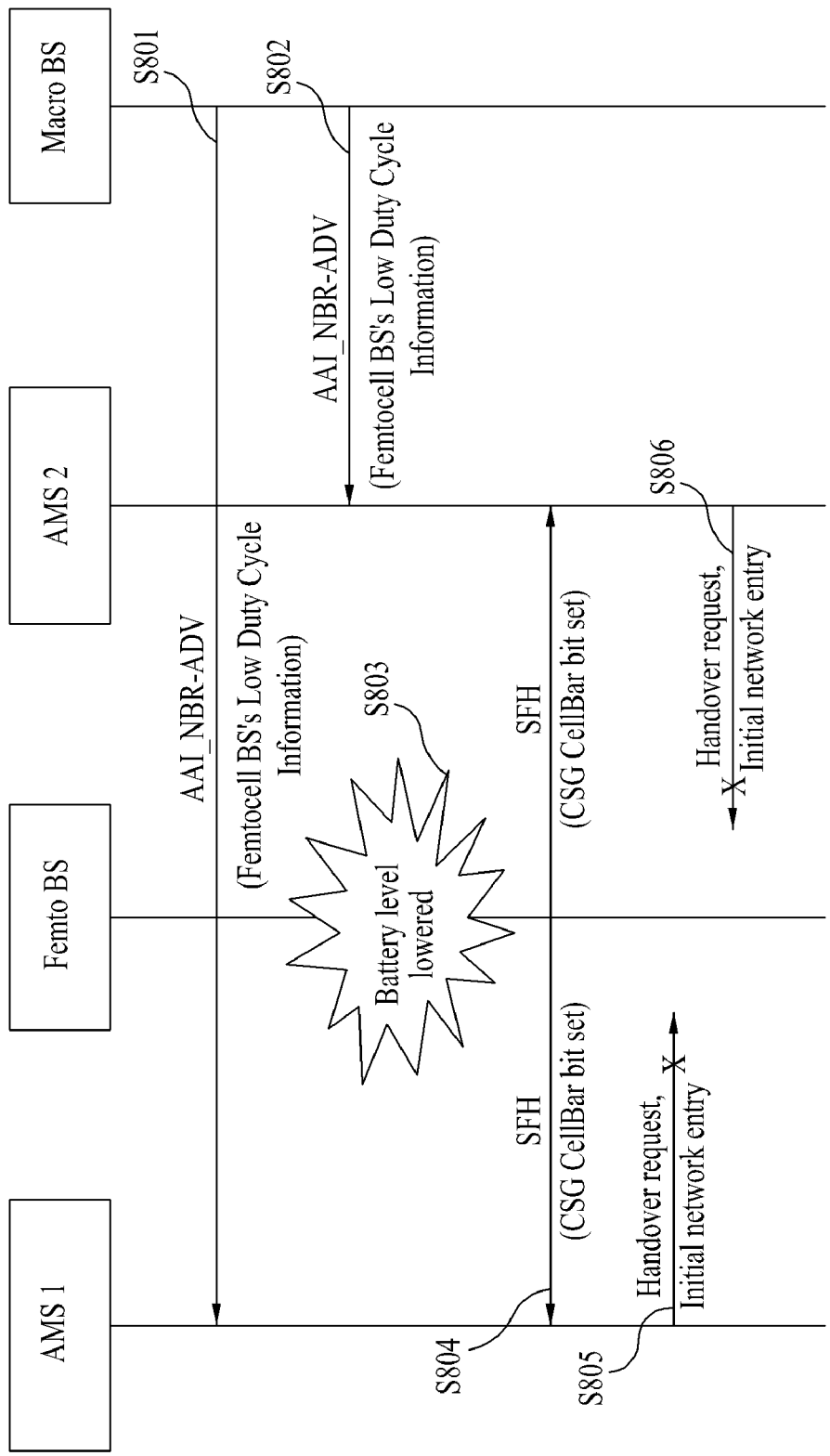
FIG. 8 is a diagram of another example for a femto base station operation in correspondence with a battery level of a femto base station according to another embodiment of the present invention.

FIG. 8 is a diagram of another example for a femto base station operation in correspondence with a battery level of a femto base station according to another embodiment of the present invention.

FIG. 8 is another example for the present embodiment described with reference to FIG. 7. FIG. 8 is applicable to every femto base station (i.e., all femto base station irrespective of a subscriber type) except a CSG femto base station.

Accordingly, a cellbar bit is preferably changed into a femto cellbar bit from a CSG cellbar bit.

Referring to FIG. 8, a mobile station 1 (AMS 1) and a mobile station 2 (AMS 2) are able to receive LDM pattern information of a femto base station from a macro base station [S801, S802].

Afterwards, when a battery level of a femto base station is lowered equal to or smaller than a prescribed threshold, the femto base station broadcasts the service unavailability to mobile stations via SFH in a manner of setting a femto cellbar bit to a specific value, e.g., 1 [S803, S804].

If the battery level is lowered equal to or smaller than the threshold, the femto base station can operate in a low duty mode by applying a low duty cycle used for the battery level equal to or smaller than the threshold.

Accordingly, each of the mobile stations may not perform a request for handover or initial network entry into the corresponding femto base station [S805, S806].

Yet, in case of receiving the SFH in which the femto cellbar bit is set, the mobile station is able to scan the corresponding femto base station by applying the low duty cycle used below the threshold.

The present embodiment is identically applicable to a case that the resource of the CSG femto base station is exhausted as well as a case that the battery level is lowered equal to or smaller than the threshold.

Moreover, like the case shown in FIG. 7, in case of FIG. 8, a base station is able to deliver two kinds of LDM pattern information such as LDM pattern information in case of a battery level above threshold and LDM pattern information in case of a battery level below threshold, as shown in Table 4, via a neighbor advertisement message. Alternatively, the base station is able to deliver one LDM pattern information, as shown in Table 5, to a mobile station only. In particular, in case that a battery level of a femto base station is lowered from a level equal to or greater than a threshold to a level below the threshold or is raised again above the threshold, a femto cellbar bit included in SFH is toggled. Simultaneously, a mobile station is able to acquire information on the changed LDM pattern from AAI_NBR-ADV message.

Table 6 partially shows a format of SFH transmitted by a CGS femto base station in the embodiment shown in FIG. 7. Table 7 partially shows a format of SFH transmitted by a femto base station in the embodiment shown in FIG. 8.

TABLE 6

| Syntax | Size(bit) | Notes |
| --- | --- | --- |
| FFI (Femto Frequency Information) | | Refer to Table 5 |
| Subscriber Type | | 0: CSG Open Femtocell BS1: CSG Closed Femtocell BS |
| CSG CellBar | | 0: Grant accesses of both CSG member and CSG non-member1: Grant access of CSG member only |
| LDC information | | |

TABLE 7

| Syntax | Size(bit) | Notes |
| --- | --- | --- |
| FFI (Femto Frequency Information) | | Refer to Table 5 |
| Subscriber Type | | 0: CSG Open Femtocell BS1: CSG Closed Femtocell BS |
| Femto CellBar | | 0: Grant access of all MS 1: Not grant access of MS no more |
| LDC information | | |

Referring to Table 6, a mobile station can be aware whether a corresponding femto base station grants a CSG member mobile station only or a CSG non-member mobile station an access, via a value of a CSG cellbar bit included in SFH of a CSG femto base station.

Referring to Table 7, a mobile station can be aware whether a corresponding femto base station grants every mobile station an access or does not grant any mobile station an access, via a value of a femto cellbar bit included in SFH of the femto base station.

Meanwhile, a femto base station status report (AAI_STS-REP) message, as shown in Table 8 or Table 9, is newly defined. A femto base station is then able to transmit a cellbar bit (e.g., CSG cellbar bit or femtocell cellbar bit) and LDM pattern information to a mobile station.

Table 8 partially shows a format of a status report message transmitted by a CGS femto base station in the embodiment shown in FIG. 7. Table 9 partially shows a format of a status report message transmitted by a femto base station in the embodiment shown in FIG. 8.

TABLE 8

| Syntax | Size(bit) | Notes |
|---|---|---|
| CSG CellBar | | 0: Grant accesses of both CSG member and CSG non-member1: Grant access of CSG member only |
| LDC information | | |

TABLE 9

| Syntax | Size(bit) | Notes |
|---|---|---|
| Femto CellBar | | 0: Grant access of all MS 1: Not grant access of MS no more |
| LDC information | | |

Referring to Table 8 and Table 9, the above described cellbar bit and the LDM pattern information are transmitted to a mobile station in a manner of being included in the status report message.

According to another example for a further embodiment of the present invention, a method of supporting a low duty mode operation of a femto base station using a low duty cycle ID (i.e., LDC ID) is provided.

A femto base station delivers a low duty cycle ID to a mobile station to enable to implicitly recognize an LDM pattern of a corresponding femto base station according to the low duty cycle ID. For instance, according to a battery level or an available resource status, a plurality of LDC IDs are defined in advance. Low duty cycles can be then mapped to the defined LDC IDs, respectively.

A femto base station operates in a low duty mode by applying an LDM pattern defined according to its battery level or an available resource status and informs a mobile station of an LDC ID. Therefore, the mobile station is enabled to be aware that the femto base station performs the low duty mode with a specific LDM pattern.

The mobile station is able to scan the corresponding femto base station using the LDM pattern mapped to the LDC ID transmitted by the femto base station.

The LDC ID can be delivered to the mobile station via a message (AAI_DREG-CMD, AAI_SLP-RSP, AAI_RNG-RSP, AAI_NBR-ADV, etc.) unicasted by a femto/macro base station or a message (SFH, AAI_NBR-ADV, etc.) broadcasted by a femto/macro base station.

Structures of Mobile Station and Base Station

In the following description, a mobile station and base stations (FBS, MBS) according to another embodiment of the present invention for implementing the above described embodiments of the present invention are explained.

First of all, a mobile station works as a transmitter in uplink and is able to work as a receiver in downlink. A base station works as a receiver in uplink and is able to work as a transmitter in downlink. In particular, each of the mobile station and the base station can include a transmitter and a receiver for transmission of information and/or data.

Each of the transmitter and the receiver can include a processor, a module, a part and/pr a means for performing embodiments of the present invention. In particular, each of the transmitter and the receiver can include a module (means) for encrypting a message, a module for interpreting the encrypted message, an antenna for transceiving the message and the like. Examples of these transmitting and receiving sides are explained with reference to FIG. 9 as follows.

Figure 9:
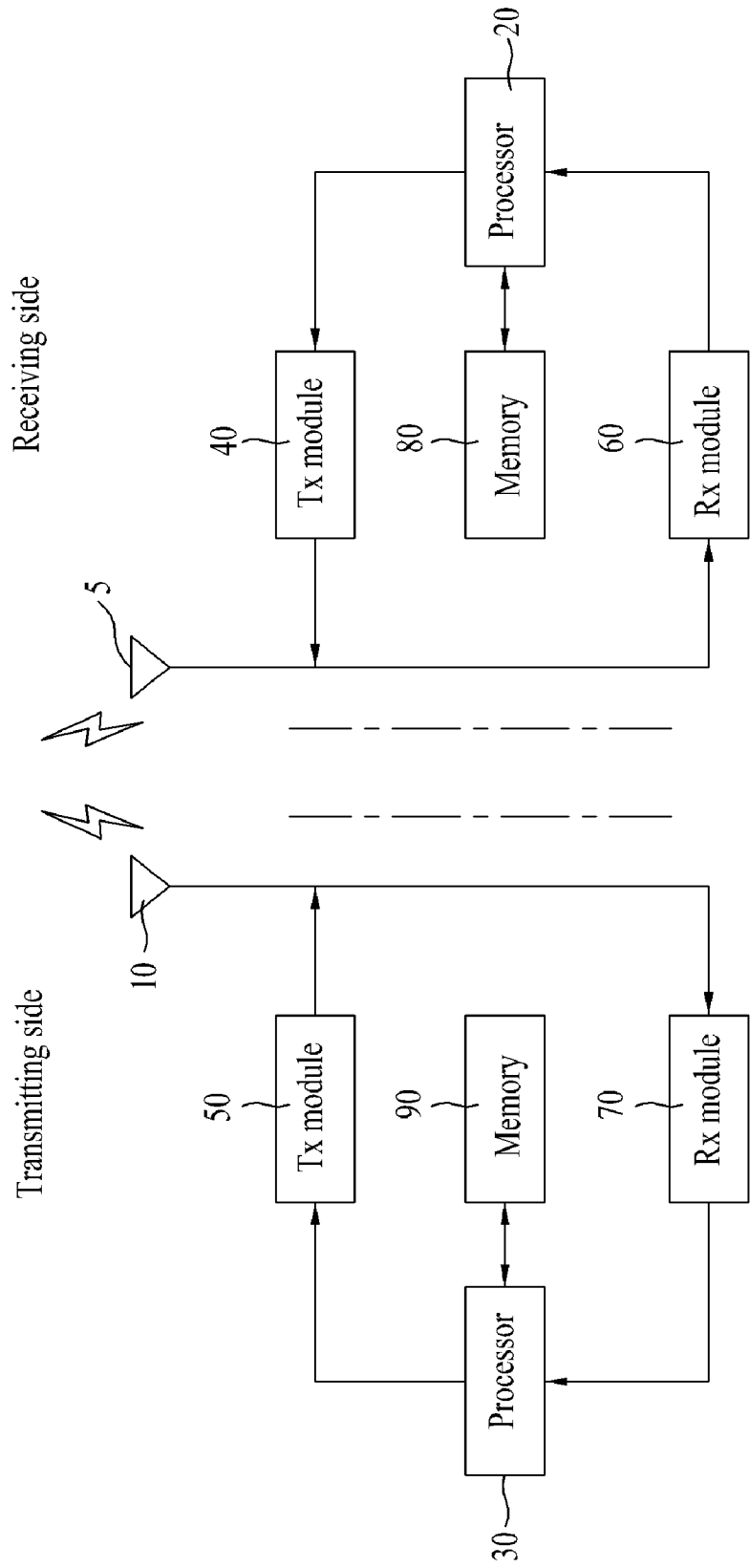
FIG. 9 is a block diagram for an example of a transmitting and receiving side structure according to another embodiment of the present invention.

FIG. 9 is a block diagram for an example of a transmitting and receiving side structure according to another embodiment of the present invention.

Referring to FIG. 9, a left side shows a structure of a transmitting side and a right side shows a structure of a receiving side. The transmitting/receiving side can include an antenna 5/10, a processor 20/30, a transmitting (Tx) module 40/50, a receiving (Rx) module 60/70 and a memory 80/90. Each of the elements can perform a corresponding function. The respective elements are explained in detail as follows.

First of all, the antenna 5/10 performs a function of transmitting a signal generated by the Tx module 40/50 externally or a function of receiving a radio signal externally and then delivering the received radio signal to the Rx module 60/70. If MIMO function is supported, at least two antennas can be provided.

The antenna, Tx module and Rx module can configure a radio communication (RF) module.

The processor 20/30 controls overall operations of the transmitting or receiving side in general. For instance, the processor 20/30 can perform a controller function for performing the above described embodiments of the present invention, a MAC (medium access control) frame variable control function, a handover function, an authentication function, an encryption function and the like.

In particular, a processor of a mobile station can acquire at least one of LDM pattern information, cellbar bit information and low duty cycle (LDC) ID of a femto base station via a unicasted message or broadcasted information from the femto base station or a macro base station by controlling a wireless communication module.

In this case, the broadcasted information can have a format of SFH or AAI_NBR-ADV message. And, the unicasted message can include one of AAI_DREG-CMD, AAI_SLP-RSP, AAI_RNG-RSP, AAI_STS-REP and the like. Moreover, the cellbar bit information can include a CSG cellbar bit or a femto cellbar bit.

Using the acquired information, the processor of the mobile station determines the LDM pattern of the femto base station explicitly or implicitly and is then able to scan the femto base station in an available interval of a low duty cycle of the corresponding femto base station.

Meanwhile, a processor of a femto base station interprets a MAC message or data received from a mobile station, allocates an uplink resource necessary for the mobile station, generates an uplink grant for informing the mobile station of the allocation history and the like, and is then able to perform scheduling for transmitting the uplink grant and the like.

In particular, when the processor of the femto base station determines that mobile stations attached to itself enter sleep mode or idle mode or determines that any mobile station does not exist around itself, it is able to determine to enter a low duty mode. Accordingly, the processor determines a low duty mode pattern in which it will operate and is then able to repeat a prescribed-length available interval operation and a prescribed-length unavailable interval operation according to the determined low duty more pattern. In doing so, the processor is able to consider its subscriber type, battery level, available resource status and the like in determining the low duty mode pattern the processor will perform. The processor sets a cellbar bit of a type suitable for the determined low duty mode pattern. The processor is able to control information on the corresponding pattern to be transmitted to a mobile station via a unicasted message or broadcast information. The processor delivers the information on the corresponding pattern to a macro base station and enables its LDM pattern information to be included in a neighbor advertisement message that is going to be broadcasted by the macro base station.

The Tx module 40/50 performs prescribed coding and modulation on data, which is scheduled to be externally transmitted by the processor 20/30, and is then able to deliver the coded and modulated data to the antenna 10/5.

The Rx module 60/70 reconstructs a radio signal externally received via the antenna 5/10 into original data by performing decoding and demodulation on the radio signal and is then able to deliver the reconstructed original data to the processor 20/30.

A program for processing and control of the processor 20/30 can be stored in the memory 80/90. And, the memory 20/30 can perform a function for temporary storage of inputted/outputted data (e.g., sleep mode information according to reference synchronization information, etc.). Moreover, the memory 80/90 can include at least one storage medium of such a type as a flash memory type, a hard disk type, a multimedia card micro type, a card type of memory (e.g., SD memory, XD memory, etc.), a Random Access Memory (RAM) type, an SRAM (Static Random Access Memory type), a Read-Only Memory (ROM) type, an EEPROM (Electrically Erasable Programmable Read-Only Memory) type, a PROM (Programmable Read-Only Memory) type, a magnetic memory type, a magnetic disc type, and optical disc type, and the like.

Meanwhile, a base station uses at least one of the above mentioned modules to perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function and the like or can further include separate means, modules and/or parts for performing these functions.

INDUSTRIAL APPLICABILITY

Accordingly, the present invention is applicable to various wireless access systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Moreover, claims failing to be explicitly cited in-between are combined to construct new embodiments or can be included as new claims by Amendment after filing the application.

The invention claimed is:

1. A method of a low duty mode operation of a femto base station in a broadband wireless access system, the method comprising:
   determining a low duty mode pattern to be performed by the femto base station according to a preset reference; and
   performing the low duty mode operation according to the determined pattern,
   wherein the preset reference includes at least one selected from the group consisting of a battery level, an available resource status and a subscriber type of the femto base station and,
   wherein if the preset reference includes the subscriber type, the low duty mode is determined to be a first low duty mode pattern if the subscriber type is a closed subscriber group (CSG) open state or a second low duty mode pattern if the subscriber type is a closed subscriber group (CSG) closed state and wherein the first low duty mode pattern is set to have a ratio of an available interval for a same period set greater by a prescribed number than that of the second low duty mode pattern.

2. The method of claim 1, wherein if the preset reference includes the battery level or the available resource status, the low duty mode is determined to be a first low duty mode pattern if the battery level or the available resource status is equal to or greater than a preset threshold or a second low duty mode pattern if the battery level or the available resource status is smaller than the preset threshold and wherein the first low duty mode pattern is set to have a ratio of an available interval for a same period set greater by a prescribed number than that of the second low duty mode pattern.

3. The method of claim 1, further comprising:
   transmitting at least one of a cellbar bit set to a value corresponding to the determined low duty mode pattern and information on the determined low duty mode pattern to a mobile station.

4. The method of claim 3, wherein the transmission is performed via one selected from the group consisting of a deregistration command (AAI_DREG-CMD) message, a sleep response (AAI_SLP-RSP) message, a ranging response (AAI_RNG-RSP) message, a neighbor advertisement (AAI_NBR-ADV) message and a super frame header (SFH).

5. The method of claim 3, wherein the cellbar bit is either a closed subscriber group cellbar bit indicating availability or unavailability for a service for a random mobile station according to a presence or non-presence of subscription of a closed subscriber group or a femto cellbar bit indicating a presence or non-presence of availability for a service to every mobile station.

6. A method of scanning a femto base station which operates a mobile station in a low duty mode (LDM) in a broadband wireless access system, the method comprising:
   obtaining information on a cellbar bit set to a value corresponding to a low duty mode pattern applied to the femto base station;
   determining a low duty cycle of the low duty mode (LDM) pattern using the obtained information; and
   scanning the femto base station during an available interval (AI) of the determined low duty cycle, wherein at least information on a low duty cycle ID (LDC ID) having the low duty mode mapped thereto or information on the low duty mode pattern is further used for the step of determining.

7. The method of claim 6, wherein the information on the low duty mode pattern includes at least one selected from the group consisting of a start frame information indicating a frame number or super frame number at a timing point that the femto base station starts the low duty mode operation, a low duty cycle information indicating a length resulting from adding one available interval (AI) and one unavailable interval (UAI) in the low duty mode pattern and an available interval information indicating a length of the available interval.

8. The method of claim 6, wherein the obtainment is performed via one selected from the group consisting of a deregistration command (AAI_DREG-CMD) message, a sleep response (AAI_SLP-RSP) message, a ranging response (AAI_RNG-RSP) message, a neighbor advertisement (AAI_NBR-ADV) message and a super frame header (SFH) and wherein the selected one is transmitted by the femto base station or a macro base station including the femto base station.

9. The method of claim 6, wherein the cellbar bit is either a closed subscriber group cellbar bit indicating availability or unavailability for a service for a random mobile station according to a presence or non-presence of subscription of a closed subscriber group or a femto cellbar bit indicating a presence or non-presence of availability for a service to every mobile station.

10. The method of claim 6, wherein the low duty mode pattern is determined with reference to at least one selected from the group consisting of a battery level, an available resource status and a subscriber type of the femto base station.

11. A mobile station, which operates in a broadband wireless access system, comprising:
a processor; and
a radio communication (RF) module configured to transceive a radio signal externally under the control of the processor,
wherein the processor controls the radio communication module to obtain information on a cellbar bit set to a value corresponding to a low duty mode pattern applied to a femto base station operating in a low duty mode, determines a low duty cycle of the low duty mode (LDM) pattern using the obtained information, and scans the femto base station during an available interval (AI) of the low duty cycle,
wherein the processor further obtains at least information on a low duty cycle ID (LDC ID) having the low duty mode mapped thereto.

12. The mobile station of claim 11, wherein the information on the low duty mode pattern includes at least one selected from the group consisting of a start frame information indicating a frame number or super frame number at a timing point that the femto base station starts the low duty mode operation, a low duty cycle information indicating a length resulting from adding one available interval (AI) and one unavailable interval (UAI) in the low duty mode pattern and an available interval information indicating a length of the available interval.

13. The mobile station of claim 11, wherein the information on the cellbar bit, the information on the low duty cycle (LDC) ID and the information on the low duty mode pattern are obtained via one selected from the group consisting of a deregistration command (AAI_DREG-CMD) message, a sleep response (AAI_SLP-RSP) message, a ranging response (AAI_RNG-RSP) message, a neighbor advertisement (AAI_NBR-ADV) message and a super frame header (SFH) and wherein the selected one is transmitted by the femto base station or a macro base station including the femto base station.

14. The mobile station of claim 11, wherein the cellbar bit is either a closed subscriber group cellbar bit indicating availability or unavailability for a service for a random mobile station according to a presence or non-presence of subscription of a closed subscriber group or a femto cellbar bit indicating a presence or non-presence of availability for a service to every mobile station.

15. The mobile station of claim 11, wherein the low duty mode pattern is determined with reference to at least one selected from the group consisting of a battery level, an available resource status and a subscriber type of the femto base station.

* * * * *